A.A.F. Rambaud
inventor
By: Marks & Clark
Attys.

Patented June 11, 1929.

1,717,258

UNITED STATES PATENT OFFICE.

AUGUSTIN ANNE FRANÇOIS RAMBAUD, OF APT, FRANCE.

MANUFACTURE OF PRESERVED FRUITS.

Application filed June 2, 1926, Serial No. 113,277, and in France January 8, 1926.

This invention has for its object a process for the rapid and continuous manufacture of preserved fruits and is essentially characterized by the fact that the syrup, used to enrich the fruits to be preserved with sugar is circulated under pressure through digesters containing fruit to be enriched, the syrup entering and leaving each digester at the top or upper part thereof, so that the displacement of the syrup, entering the first digester with the maximum concentration and issuing from the last digester with the minimum concentration, takes place by the difference in density and through the upper part of the digesters, that is to say at the top of the latter, in a horizontal direction and at an extremely reduced speed, for the purpose of ensuring the progressive saturation of the preserved fruits in the course of manufacture and of eliminating all pressure on the latter.

The invention has also for object a plant for carrying out the process above set forth, this plant essentially comprising:

(a) Several independent series of digesters which, adapted to contain the fruits to be preserved and preferably heated individually, are each provided, at their upper part, with two couplings, one for the admission and the other for the discharge of the syrup and are connected one to the other by a tube branched on the discharge or outlet coupling of a digester and on the inlet coupling of the following digester; the first of the digesters, in each series, is connected, by its inlet coupling, to the syrup supply, and the last of the digesters, in each series, is provided with an outlet pipe for the diluted syrup, which pipe is branched on the outlet coupling of the said digester and the outflow of which is so controlled as to be smaller than that of the inlet tube for ensuring the flow of the syrup through the totality of the digesters of each series and adjusting the speed of this flow.

(b) Tanks containing a syrup having the suitable degree of concentration and feeding, in each series, the first of the digesters having a pipe-line the outflow of which is adjustable, these tanks being arranged at a suitable level above the digesters or being subjected to a certain internal pressure, so that the circulation of the syrup through the digesters takes place under a pressure which can be equal to, or smaller or greater than one atmosphere, according to the nature of the fruits to be preserved.

(c) Vessels adapted to receive the syrup of minimum concentration flowing, at the upper part of the last digester of each series, through the outlet pipe of this last digester, these vessels being provided either in a number equal to that of the series of digesters and each receiving the diluted syrup coming from the last digester of one of the series of digesters, or in a number smaller than that of the series of digesters and each receiving the diluted syrup coming from several series of digesters.

(d) Vacuum cooking or other apparatus for the regeneration of the diluted syrup which, collected in the totality of the above-mentioned vessels, is, after its regeneration, led by any suitable means either into the supply tanks, or into a reserve tank.

The digesters, in the above plant, can be advantageously heated by means of water-baths independently of each other, which, each enclosing one or several digesters, are traversed by a circulation of steam coming from a high or low pressure boiler and delivered, in an adjustable manner in each water-bath for modifying the temperature of the latter and, consequently, that of the digesters, according to the needs of the manufacture.

In the process and plant forming the subject-matter of this invention, the supply tanks contain syrup which circulates only once in the series of digesters. The capacity of each of these tanks as well as that of the vessels receiving the diluted syrup after its circulation through the digesters is, moreover, such that the plant can normally operate without supervision during a predetermined time and thus permit an automatic and continuous manufacture.

The flow of the syrup through the digesters is, moreover, controlled in each series in such a manner that the outflow at the outlet is less than that of the supply conduit pipe so that the syrup may always be under a head pressure in the totality of the digesters and that the pressure may, from this fact, be effective in the latter.

Finally, by admission and delivery of the syrup at the upper part of each digester, the most concentrated syrup falls to the bottom and pushes upward the less concentrated syrup which flows in turn into the following digester in which the same phenomenon occurs.

This displacement of the syrup is therefore effected, in accordance with the invention, by difference of density and the circulation of this syrup takes place through the upper part of the digesters, in a horizontal direction, and at a very reduced speed, so that the fruits are in a practically motionless medium the density of which alters but insensibly and the saturation of these fruits progressively takes place without displacement and pressing of the latter against the walls of the digesters.

In order that the invention may be clearly understood, I have illustrated a suitable arrangement of apparatus for carrying out my process reference being had to the accompanying diagrammatic drawing in which.

Figure 1:
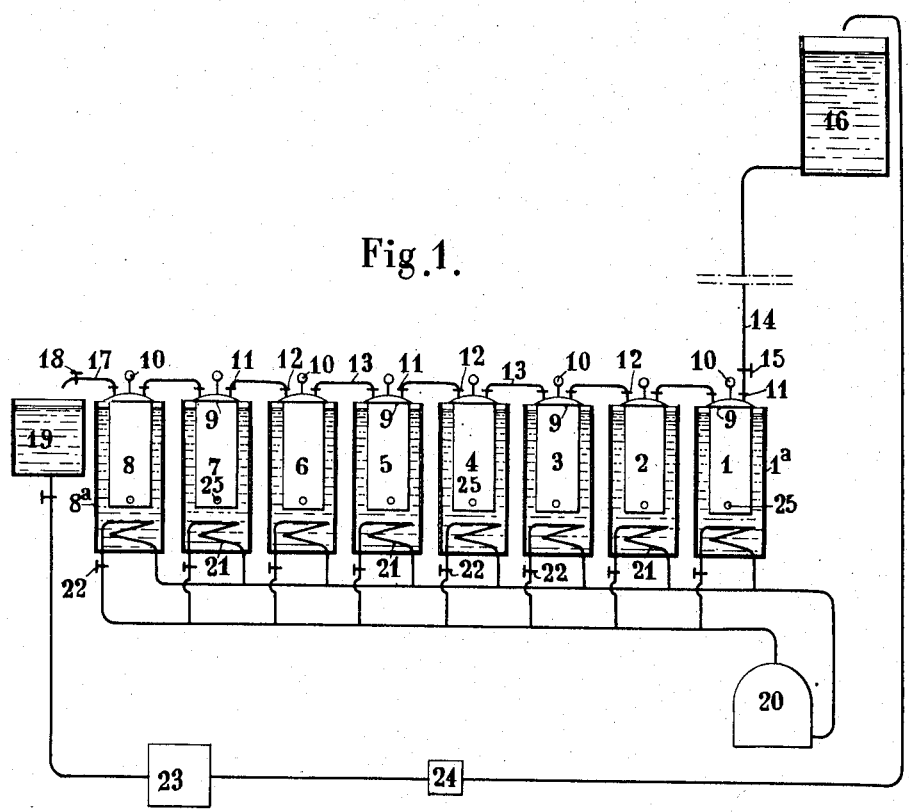
Fig. 1 is a longitudinal vertical section along the axis of one of the series of digesters.
Figure 2:
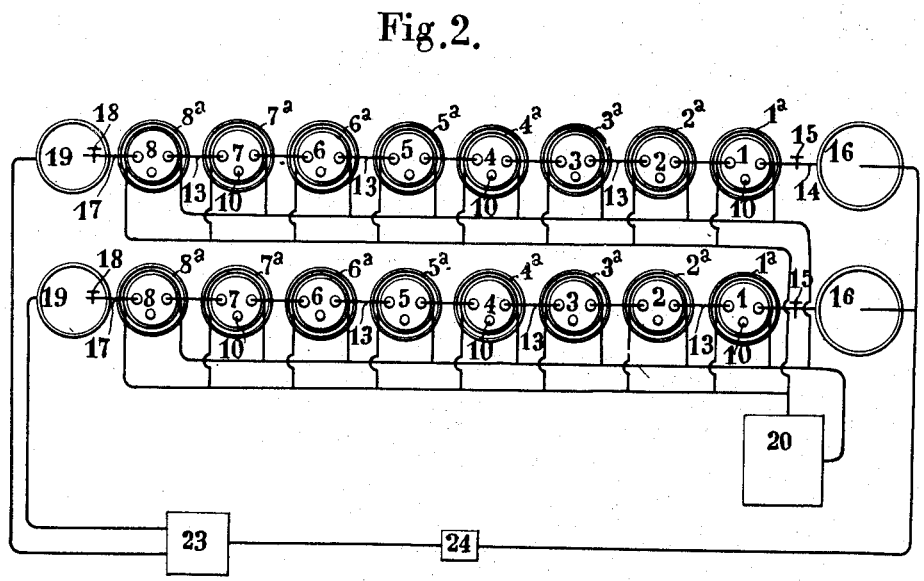
Fig. 2 is a plan view.

As shown in the accompanying drawing, the apparatus substantially comprises digesters which are adapted to receive the fruits to be preserved in metallic open-work baskets or in wooden boxes provided with a silk-cloth bottom according to the kind of fruits, and which are grouped, in accordance with the importance of the plant, in a number of series independent from each other.

Each of these series can of course comprise any number of digesters, this number being the same or different in each series. In the example illustrated, each series is supposed to be constituted by eight digesters, respectively indicated at 1, 2 ... 7 and 8.

These digesters are each closed in a fluid-tight manner by a cover 9 provided with an air pet-cock 10 and two couplings 11 and 12. The various digesters are connected one to the other in each series, as clearly shown, by means of a tube 13 fitting, at its ends, on the coupling 12 of a digester and on the coupling 11 of the following digester so as to thus put the totality of the digesters constituting a series in communication through their upper part.

In each series, the first digester 1 is connected, through the medium of a pipe 14 branched on the coupling 11 and provided with a cock 15, to one of the tanks 16 which, containing the syrup adapted to circulate through the digesters, in the various series, are arranged at a suitable level above these digesters, or are subjected to a certain internal pressure so that the circulation of the syrup through these digesters takes place under pressure.

The last digester 8 of each series is provided with a pipe 17 which, branched on the coupling 12 of this digester, is provided with a cock 18 and opens above a vessel 19 adapted, as will be explained hereinafter, to receive the syrup when issuing from the last digester.

As shown in the drawing, the plant illustrated by way of example only, comprises only as many tanks 16 and vessels 19 as there are series of digesters, each tank 16 supplying with syrup one of these series and each vessel 19 collecting the syrup after its passage in the totality of the digesters of a given series, but it is obvious that the number of these tanks 16 and of these vessels 19 might be smaller than that of the series of digesters, each tank and each vessel being used, in this case, for several series of digesters.

The various digesters in the plant are arranged in water-baths $1^a$, $2^a$ ... $7^a$, $8^a$, independent from each other and heated, preferably by steam which, coming from a single high or low pressure boiler 20, for the entire plant, is delivered in coils 21 or other suitable parts, by means of valves 22 permitting control of the circulation of steam in each water-bath and consequently the temperature in each digester according to the needs of the manufacturer.

As illustrated in the drawing, the plant can also be provided with a vacuum cooking apparatus 23 which, in this form of construction, is used for regenerating the quantity of diluted syrup which flows for instance only once in 24 hours in the various vessels 19. The syrup after its regeneration, can be led into a reserve tank, or directly into the supply tanks 16 by a compressed air or steam elevating device 24, as illustrated by way of example in the drawing, or by a pump, a vacuum tank and, generally speaking by any suitable means and devices.

The operation of the plant described above is as follows:

The fruits, previously bleached, are introduced into the digesters which, in each series, are connected together, as explained above, by the pipes 13, the first of these digesters 1, being connected to the supply tank 16 and the air petcocks 10 of each digester being open, the syrup-supply cock 15 is opened as well as the cock 18 in the outlet pipe 17 of the last digester of each series.

After exhaustion of the air, the pet-cocks 10 are turned off and the opening of these two cocks 15 and 18 is adjusted in such a manner that the flow through pipe 17 is smaller than that of the supply pipe-line 14. In other words, the cock 18 so limits the flow of the syrup that the flow takes place but slowly, that all the digesters are entirely filled with syrup and that the latter is always under a head pressure in the totality of these digesters.

For effecting the progressive starting of the plant described above, the various series of digesters being at the beginning of the manufacture, the tanks 16 contain syrup at 25° Baumé and supply the head digesters with this syrup during the first twenty-four hours of the manufacture. The density of the syrup is progressively increased by 5°, so as to supply these head digesters with syrup of maximum density only 6 to 10 hours before the end of the manufacture.

These figures are, of course, given by way of example only, as the initial density of the syrup as well as the progressive increase of this density can be modified according to the nature of the fruits to be preserved, and according to the rapidity of manufacture it will be possible to obtain with these latter.

Likewise, it is to be understood that in case the plant comprises as many tanks 16 as there are series of digesters, that these digesters can, in each series, contain different fruits and that the density of the syrup contained in the tanks 16 can thus vary from one of these tanks to the other.

The syrup flowing from the supply tanks 16 enters the first digester 1 at the upper part of the same and slightly dilutes.

The syrup of greater density falls of course to the bottom of this digester and drives upwardly the lighter syrup which flows through the coupling 12 and pipe 13 into the second digester 2.

The same phenomena are reproduced in this digester and in the following ones in which the syrup enters and issues in the same manner, so that the syrup which flows from the last digester 8 through the pipe 17 is very diluted.

The displacement of the syrup in the various digesters is effected, in accordance with the invention, by difference of density and as the circulation of this syrup is very slow, the saturation of the fruits is obtained in a progressive manner, the fruit at the bottom being in each digester at a more advanced period of manufacture than those at the top and thus being, in the vertical direction, in the same order of density as the syrup.

Besides, the circulation of the syrup taking place through the upper part of the digesters and, consequently, in a horizontal direction, does not impart any vertical displacement to the fruits so that the latter are not subjected to any thrust action.

They are in equilibrium in a nearly motionless medium the density of which is modified but insensibly and this is favourable for the saturation.

In fact, if we consider for instance eight digesters placed one after the other and containing, at the end of the manufacture, syrup the density of which varies between 39° Baumé in the supply tank 16 and 0° in the vessel 19, the mean difference between two consecutive digesters is of about 5° Baumé.

If it is desired to manufacture the contents of two digesters per twenty-four hours, in each digester the density will increase, on an average, by 5° Baumé per period of twelve hours, so that in a given point in each digester the density will increase by ½° Baumé per hour.

Sugar and glucose having a high molecular density slowly diffuse, so that if the syrup entering in each digester is denser by 5° Baumé than the syrup issuing therefrom, these 5° of difference will be regularly distributed along the height of the digester.

As the fruits placed in a sugar syrup tend to saturate with sugar and to give out water by osmosis proportionally to the density of the bath, the fruits at the bottom being always in a denser syrup, will be, from this fact, always in a more advanced condition of manufacture relatively to the fruits at the top, so that the fruits contained in a digester will be preserved when the upper layer of these fruits will have reached the desired condition of saturation.

When the fruits contained in the head digester 1 are preserved, the syrup-supplying cock 15 is turned off, and the said digester is taken out of the circuit and immediately replaced by a digester containing fruits recently placed in sugar.

This new digester will become the end or tail digester, it will receive the syrup flowing from the digester 8 and will discharge the diluted syrup into the vessel 19.

It then suffices for continuing the operation to connect the syrup tank 16 with the digester 2 which, in its turn is removed, when the fruits contained therein are preserved, and replaced by a new one, then with the digester 3 and so on without any stoppage in the manufacture.

The tanks 16 receive of course, every time it is considered necessary, syrup which can be made either with new raw materials, or with syrups having already circulated but concentrated and revived, if need be, by additions of new sugar and glucose.

From the foregoing, it will be understood that the manufacture of preserved fruits according to the process and with the plant of this invention does not require any supervision concerning the circulation of the syrup and that it is simply necessary that, in each series of digesters, the syrup-supplying tank 16 as well as the vessel 19 receiving the diluted syrup should have a sufficient capacity for permitting a continuous fabrication night and day, the same syrup circulating only once in a series of digesters and slowly passing through these digesters, at the outlet of which it is collected, in a very diluted condition, and is regenerated, only once per 24 hours for instance, in the vacuum cooking apparatus 23, or in any other suitable apparatus.

This regenerated syrup is then led by any means, by an elevating apparatus 24 for instance, either into a reserve tank, or directly into the supply tanks 16 in order to be used again.

In the plant illustrated, the digesters are individually heated so as to give the possibility of easily regulating the temperature of these digesters according to requirements and, more particularly, of maintaining the two end digesters at a higher temperature, for the purpose of preventing fermentations which can take place in these digesters by the penetration of ferments brought in either by the syrup coming from the elevated vessel and entering the first digester, or by the fruits in course of manufacture introduced in the last digester, but it is obvious that each water-bath could also contain several digesters.

The above described arrangements are of course given by way of example only; the number, dimensions and detail arrangements of the digesters as well as the method of heating the same can obviously vary without departing thereby from the principle of the invention.

These digesters might, for instance, be provided at their lower part with a coupling 25 which, normally closed by a plug and adapted to empty the digester, might be advantageously used in case, in the manufacture of certain preserved fruits, the syrup would reach in the final stage such a degree of viscosity that its superficial circulation would be rendered difficult.

In this case, it would be of advantage to remove from the circuit the head digester before the manufacture is completely finished and in injecting at the top a certain quantity of syrup under pressure for evacuating through the coupling 25 the syrup which is too viscous. Accessorily, the inlet coupling 11 of each digester might be slightly within the latter for allowing the admission of the syrup to take place in the upper third of the fruits under treatment.

Finally the plant might be completed by any auxiliary devices permitting control of the flow, and the temperature and the pressure of the syrup.

In the case of a manufacture of small importance, this plant can comprise a single series of digesters.

I claim:—

1. The process of enriching fruits with sugar which comprises maintaining a mass of fruit to be enriched in a closed container, introducing concentrated sugar solution into the top thereof, allowing the concentrated sugar solution to diffuse down through the mass of fruit therein and withdrawing diluted sugar solution likewise from the top of the container.

2. The process of enriching fruits with sugar which comprises maintaining a mass of fruit to be enriched in a closed container continuously introducing concentrated sugar solution into the top thereof, allowing the concentrated sugar solution to diffuse down through the mass of fruit therein and continuously withdrawing diluted sugar solution likewise from the top of the container.

3. The process of enriching fruits with sugar which comprises maintaining a plurality of separated masses of fruit in a series of closed containers, introducing concentrated sugar solution into the top of one of said containers, allowing the concentrated sugar solution to diffuse down through the mass of fruit, withdrawing diluted sugar solution likewise from the top of said one of said containers, passing the diluted sugar solution to another of said containers and introducing it into the top thereof, allowing the diluted sugar solution to diffuse down through the mass of fruit therein, withdrawing further diluted sugar solution from said last mentioned container, passing the further diluted sugar solution to and into the top of a third container, and in this fashion passing the sugar solution through the series of containers and masses of fruit contained therein.

4. The process of enriching fruits with sugar which comprises maintaining a plurality of separated masses of fruit in a series of closed containers, continuously introducing concentrated sugar solution into the top of one of said containers, allowing the concentrated sugar solution to diffuse down through the mass of fruit, continuously withdrawing diluted sugar solution likewise from the top of said one of said containers, continuously passing the diluted sugar solution to another of said containers and continuously introducing it into the top thereof allowing the diluted sugar solution to diffuse down through the mass of fruit therein, continuously withdrawing further diluted sugar solution from said last mentioned container, continuously passing the further diluted sugar solution to and into the top of a third container, and in this fashion continuously passing the sugar solution through the series of containers and masses of fruit contained therein.

5. The process as in claim 1 in which the mass of fruit is heated during treatment with the sugar solution.

6. The process as in claim 2, in which the mass of fruit is heated during treatment with the sugar solution.

7. The process as in claim 3, in which the mass of fruit is heated during treatment with the sugar solution.

8. The process as in claim 4, in which the mass of fruit is heated during treatment with the sugar solution.

The foregoing specification of my "Process and plant for the rapid and continuous manufacture of preserved fruits" signed by me this 18th day of May, 1926.

AUGUSTIN ANNE FRANCOIS RAMBAUD.